(12) United States Patent
Cromer et al.

(10) Patent No.: US 7,430,452 B2
(45) Date of Patent: Sep. 30, 2008

(54) APPARATUS, SYSTEM, AND METHOD FOR SELECTIVITY PROTECTING A MOTION SENSITIVE COMPONENT IN A COMPUTERIZED DEVICE

(75) Inventors: Daryl Carvis Cromer, Apex, NC (US); Howard Jeffrey Locker, Cary, NC (US); Tin-Lup Wong, Chapel Hill, NC (US)

(73) Assignee: Lenovo (Singapore) Pte. Ltd., Central 1 (SG)

( * ) Notice: Subject to any disclaimer, the term of this patent is extended or adjusted under 35 U.S.C. 154(b) by 285 days.

(21) Appl. No.: 11/333,138

(22) Filed: Jan. 17, 2006

(65) Prior Publication Data

US 2007/0168047 A1 Jul. 19, 2007

(51) Int. Cl.
*G05B 9/02* (2006.01)
*G11B 15/04* (2006.01)
*G01P 15/00* (2006.01)

(52) U.S. Cl. .............................. 700/79; 360/60; 73/488
(58) Field of Classification Search .................. 700/79, 700/62, 63, 646; 360/60; 73/488, 382 R, 73/526
See application file for complete search history.

(56) References Cited

U.S. PATENT DOCUMENTS

| | | | | |
|---|---|---|---|---|
| 4,786,995 A * | 11/1988 | Stupeck et al. | ................ | 360/75 |
| 5,227,929 A * | 7/1993 | Comerford | .................... | 360/75 |
| 5,333,138 A | 7/1994 | Richards et al. | ................ | 371/7 |
| 5,982,573 A * | 11/1999 | Henze | .......................... | 360/75 |
| 6,061,404 A | 5/2000 | Yonemitsu et al. | .......... | 375/242 |
| 6,067,203 A | 5/2000 | Ottesen et al. | ................. | 360/73 |
| 6,520,013 B1 * | 2/2003 | Wehrenberg | ................. | 73/489 |
| 6,603,620 B1 | 8/2003 | Berding | ....................... | 360/60 |
| 6,771,449 B1 * | 8/2004 | Ito et al. | ........................ | 360/75 |
| 6,854,028 B2 * | 2/2005 | Smith | ......................... | 710/100 |
| 7,142,385 B2 * | 11/2006 | Shimotono et al. | ............. | 360/60 |
| 2003/0067705 A1 | 4/2003 | Ishiyama et al. | ............... | 360/75 |
| 2004/0125490 A1 | 7/2004 | Fujiki et al. | .................... | 360/75 |
| 2004/0125493 A1 | 7/2004 | Shimotono et al. | ............ | 360/75 |
| 2004/0252401 A1 * | 12/2004 | Abe et al. | ....................... | 360/75 |
| 2005/0088773 A1 * | 4/2005 | Yoshida | ........................ | 360/75 |

\* cited by examiner

*Primary Examiner*—Thomas K Pham
(74) *Attorney, Agent, or Firm*—Kunzler & McKenzie

(57) ABSTRACT

An apparatus, system, and method are disclosed for balancing the read and write requirements of applications running in a computerized system against the requirements to protect a motion sensitive device in the system and requirements to protect data. The apparatus includes an application interface, a motion policy module, and a control module. The application interface delivers configuration parameters and system information to the motion policy module which establishes a policy for controlling the motion sensitive devices. The control module is configured to selectively communicate with one or more applications running in the computerized system and motion sensitive devices on the system. The control module executes actions to protect motion sensitive devices and system data and to maintain data read and write rates on the system in accordance with the configured protection policies and inputs from motion sensor devices.

15 Claims, 8 Drawing Sheets

APPARATUS, SYSTEM, AND METHOD FOR SELECTIVITY PROTECTING A MOTION SENSITIVE COMPONENT IN A COMPUTERIZED DEVICE

BACKGROUND OF THE INVENTION

1. Field of the Invention

This invention relates to portable computing devices and more particularly relates to protecting motion-sensitive devices within portable computing devices.

2. Description of the Related Art

Portable computing devices continue to become more complex and powerful. At the same time, they also are being used in more and more environments. Examples of portable computing devices include laptops, tablet PCs, personal digital assistants (PDAs), MP3 players, in-dash-mounted automobile computing devices, desktop computers and the like. For purposes of this application, a portable computing device includes all computing devices which maybe sensitive to movements and consequently desktop computers are also included in this list as they are sometimes moved or jarred during normal operation.

Portable computing devices include various means for input and output (I/O) including corded and wireless keyboards, corded and wireless mice, LCD screens, Ethernet, blue-tooth, infrared, USB connections, USB memory keys, and 802.11 wireless LANs. The amazing diversity of broadband I/O allows many of these devices to rely on data stored on larger, remote storage devices. While the complexity and utility of these devices continuously increases, the size of the devices has decreased to the point that many can be carried into remote and unpredictable environments. Portable computing devices are used in conference rooms, on airplanes, in subways, in cars, and in spacecraft. They are used while sitting at a desk, while walking, and while running.

Despite the broad range of network connectivity available to portable devices, many of them continue to utilize motion sensitive devices. These motion sensitive devices may be hard disk drives (HDD), CD drives, DVD drives or other devices typically having moving mechanical components which are sensitive to motion. Even those portable devices that contain no moving mechanical components may contain circuitry which is sensitive to extreme motion or may be connected to motion sensitive devices from time to time such as a USB micro drive. All electronic devices which may be adversely affected by motion are referred to herein as "motion sensitive devices." A large portion, but not all, of these devices have moving components.

Unfortunately, despite advances in mechanical device technology, motion sensitive devices are highly susceptible to data errors, data loss, and catastrophic device failure caused by movement of the device. Movements of the device may include gentle relocation, jars, bumps, drops, collisions and the like. Movements may also be classified according to the acceleration forces and directional vectors imposed on the motion sensitive device. Some forces may cause more damage, not only according to intensity, but also according to the direction of the force or the sequencing of a series of forces. Some movement intensities and types will have a greater deleterious effect upon a motion sensitive device than others as they adversely affect moving parts and other sensitive elements of a motion sensitive device. These movements may adversely affect the moving parts of such a device as well as non-moving parts.

Some portable computing devices contain an accelerometer configured to immediately shut down a motion sensitive device upon the detection of any movement. However, these systems often shut down motion sensitive devices for all detected movements or when critical data is flowing. A laptop configured with an accelerometer to shut down a hard disk upon detection of movement may protect the hard disk from catastrophic failure incident to an accidental free-fall event, but may also shut down a hard disk in response to typing on the keyboard, or during an important video presentation as the result of the bumping of a supporting table. The continuance of an important video presentation may justify continued use of a motion sensitive device, despite detected movements. However, the current technology requires the immediate shutdown of a motion sensitive device regardless of the current activities running on a portable computing device.

From the foregoing discussion, it should be apparent that a need exists for an apparatus, system, and method that selectively protect a motion sensitive device in a portable computing device based on various parameters including movement intensity, movement type, user established priorities and the time-sensitive nature of currently running applications. Beneficially, such an apparatus, system, and method would protect motion sensitive devices from extreme movements and allow users and applications to select motion sensitivity levels according to user and application determined parameters.

SUMMARY OF THE INVENTION

The present invention has been developed in response to the present state of the art, and in particular, in response to the problems and needs in the art that have not yet been fully solved by currently available portable computing devices. Accordingly, the present invention has been developed to provide an apparatus, system, and method for selectively protecting a motion sensitive device in a portable computing device that overcome many or all of the above-discussed shortcomings in the art. Motion sensitive devices may include CD/DVD players and writers, hard disks, and other devices that maybe affected by motion. Inconsistent read and write streams to these devices may compromise their performance and may compromise the performance of applications which depend upon them.

The apparatus to selectively protect a motion sensitive device is provided with a logic unit containing a plurality of modules configured to functionally execute the necessary steps. These modules in the described embodiments include a motion policy module, a motion detection module, and a control module. The modules are configured to detect acceleration events and then to selectively execute an action in response to the acceleration event and in accordance with a motion response policy managed by the motion policy module.

The apparatus, in one embodiment, is configured to balance the two competing goals of protecting the motion sensitive device from damage and the goal of maintaining data flow between the motion sensitive device and applications currently running on the portable computing device. Under some circumstances, in response to acceleration events, the motion policy module causes the shutdown of the motion sensitive device to protect that component.

Under different circumstances, in response to acceleration events, the motion policy module signals the currently running applications to modify their write rates to momentarily reduce buffering requirements in anticipation of the possible future shutdown of the motion sensitive device. Under still different circumstances, in response to acceleration events, the motion policy module elects to maintain normal data flow rates between the motion sensitive device and the currently running applications, insuring a constant data flow rate to the applications while increasing the risk that an acceleration event may cause damage to the motion sensitive device.

The apparatus is further configured, in one embodiment, to allow the application interface module to receive motion policy configuration parameters from user input, which are used by the motion policy module in determining appropriate actions. In a further embodiment, the apparatus may be configured to allow the application interface module to receive protection policy configuration parameters from currently running applications or from the operating system of the portable computing device, which are used by the motion policy module in determining appropriate actions.

A system of the present invention is also presented for selectively protecting a motion sensitive device of the system. The system includes components substantially similar to those described above in relation to different embodiments of the apparatus. In particular, the system, in one embodiment, includes a portable computing device having a motion sensitive device, a processor, an accelerometer, and memory containing various programs including the modules described above—a motion policy module, a motion detection module, and a control module.

The system may further include motion sensitive aware applications which are capable of communicating data transport parameters to the application interface and may further be capable of receiving data rate instructions from the system. The data transport parameters may signal a modification of data I/O buffers or a modification of data read or write rates.

A method of the present invention is also presented for protecting a motion sensitive device in a computing device. The method in the disclosed embodiments substantially includes the steps necessary to carry out the functions presented above with respect to the operation of the described apparatus and system. In one embodiment, the method includes managing a motion response policy, detecting an acceleration event, and selectively executing an action in response to the acceleration event in accordance with the motion response policy. The method also may include configuring a motion response policy.

In a further embodiment, the step of configuring a motion response policy may be initiated by the user of the apparatus or system or may be initiated by applications concurrently running with the apparatus or on the system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
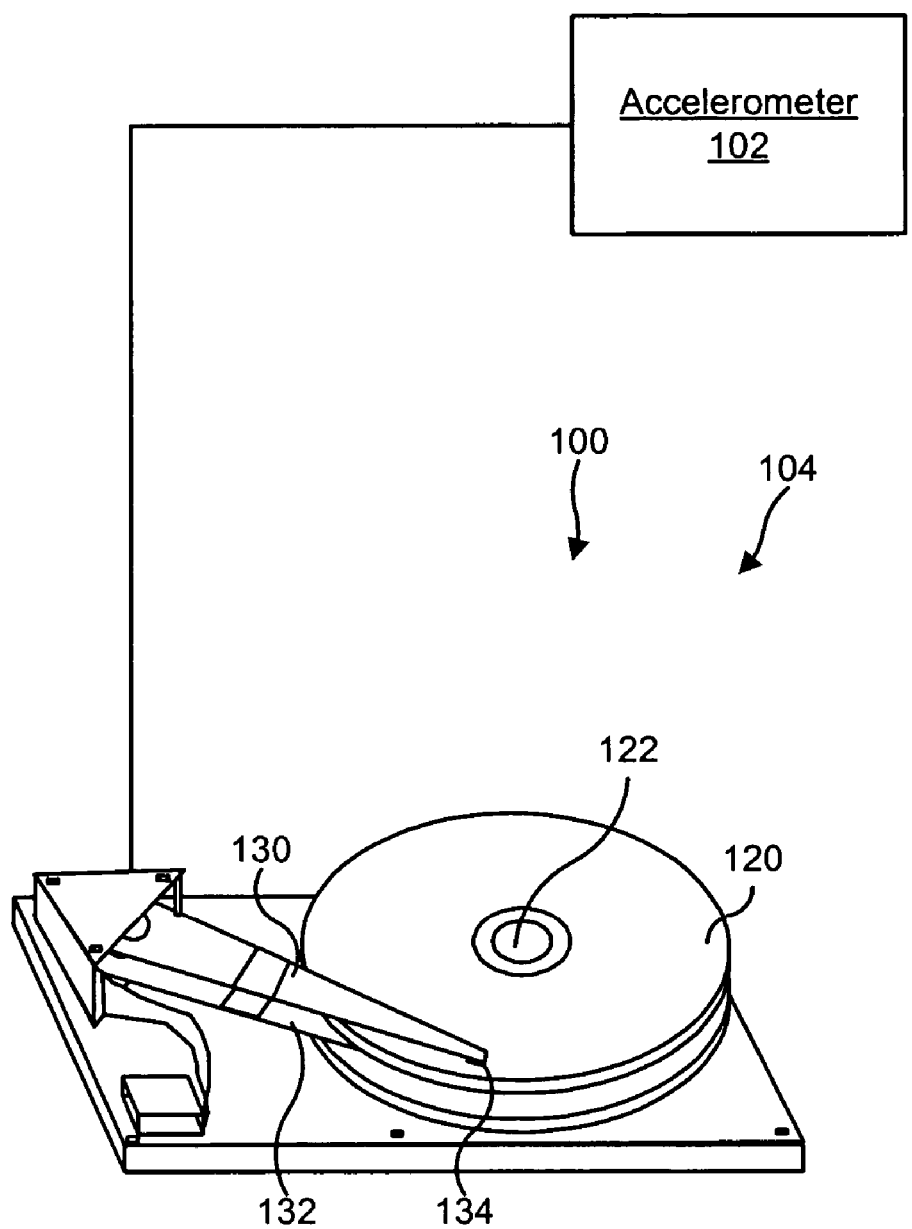
FIG. 1 is a schematic block diagram illustrating a conventional motion protection system.

Many of the fictional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts a motion sensitive device 100 of the present invention. In the depicted embodiment, the motion sensitive device is a hard disk drive (HDD) 104. The HDD 104 is logically connected to an accelerometer 102 in a fashion currently known in the art. The HDD 104 consists of several subcomponents including at least one platter 120 mounted on a spindle 122. The platter 120 is made of a material which allows magnetic polarizations to be applied to the upper or lower surfaces of the platter.

The HDD is configured to turn the spindle and the platter at several thousand revolutions per minute using a motor (not shown). The HDD further includes at least one arm which extends over the surface of the platter 120. The drawing shows an upper arm 130 and a lower arm 132 which extend just above and just below the upper and lower surfaces of the platter, respectively. Each arm is configured with a head 134 which is capable of creating magnetic polarizations on the surface of the platter and is also capable of detecting magnetic polarizations on the surface of the platter.

The upper and lower arms 130 and 132 are pivotally connected to the HDD system such that the heads may move in an arc across the surface of the platter while the platter is spinning about the spindle, allowing the heads to create and detect magnetic polarizations at any location on the platter.

In modern HDD devices, multiple platters may be stacked vertically, each platter being centrally mounted on the same spindle with an upper and lower arm provided for each platter.

The process of creating and detecting magnetic polarizations on the platter surface correlates to the writing and reading of individual logical bits which are used for writing and retrieving digital data. A single HDD may allow for the reading and writing of trillions of such bits.

The HDD is sensitive to sudden movements, jars, bumps and the like. A typical platter may spin at 7200 revolutions per minute. The arms move in an arc like fashion across the platter at very high speeds. The head "flies" over the platter on a cushion of air. In reality, the platter spins and the head remains stationary. However, the head is often described as flying over the platter. Sudden movements of the hard disk may cause the head to touch the platter or "crash." The physical contact of the head with the platter may cause damage to the platter, damage to the head, and irretrievable loss of data stored on the platter.

In order to prevent head crashes, the HDD may be shutdown. Shutting down the hard disk may involve either a complete power down of the HDD or a temporary shutdown of the HDD. Temporary shutdown may involve parking the heads of the HDD. Parking is a process to move the arm into a position that will not allow the head to make physical contact with the platter. Parking may be executed prior to moving a computing device in order to protect the mechanical components of the HDD or while the HDD is operating normally. Parking protects the data stored on the HDD.

The HDD shown shows only one platter with an upper and lower arm for accessing data on the single platter. Modern hard disk drives may have multiple platters with upper and lower arms for each platter.

In current devices, the accelerometer 102 is used to predict when the HDD should be parked. The accelerometer detects movements of the portable computing device. The accelerometer is configured to cause the HDD to shutdown based detected movement by the accelerometer.

The shutdown process may include parking the HDD or may include shutting down the HDD altogether.

The HDD of FIG. 1 is illustrative of a motion sensitive device found in a portable computing device. Compact disk devices and DVD devices are further examples of motion sensitive devices which may be controlled by the invention.

Figure 2:
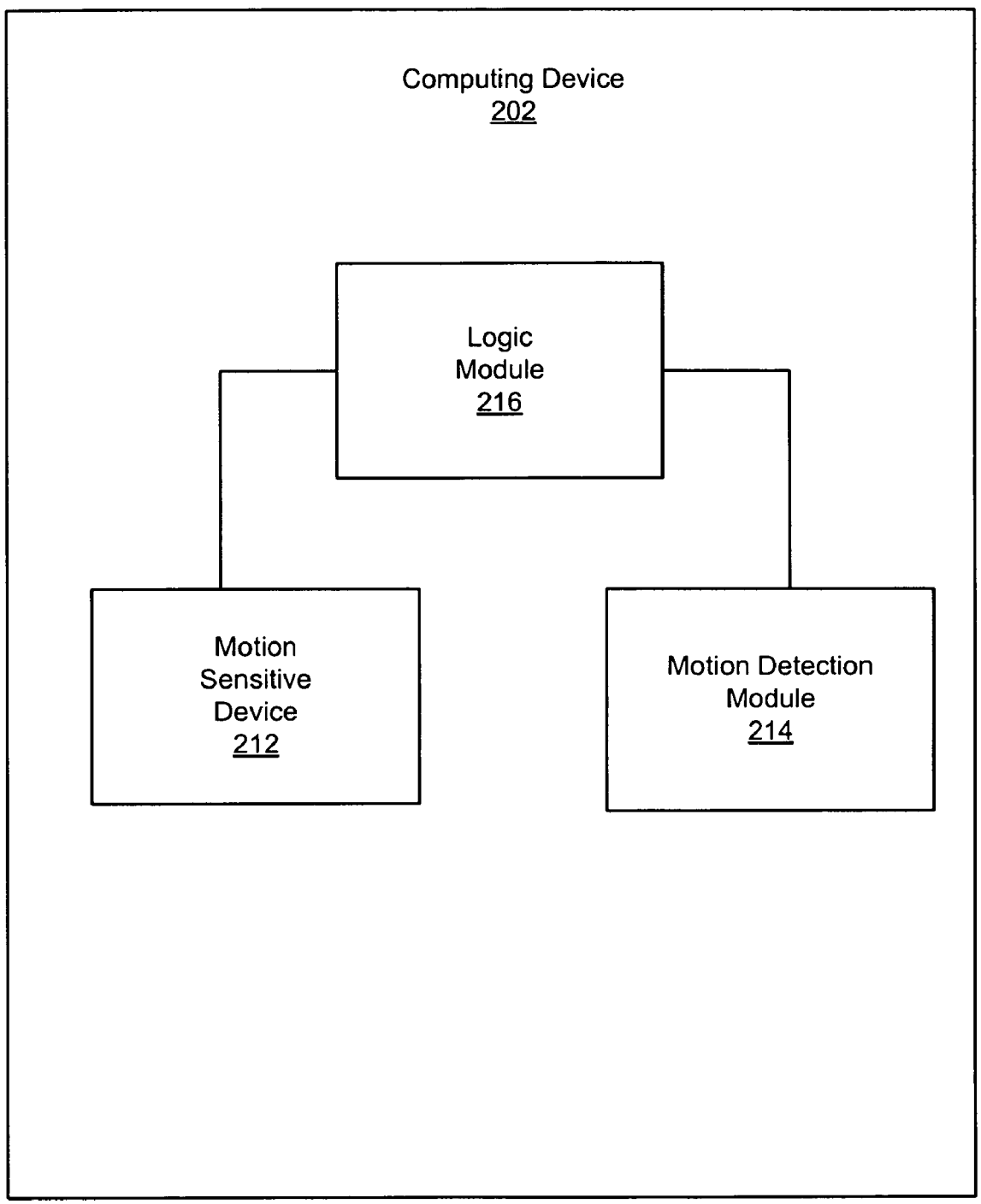
FIG. 2 is a schematic block diagram of one embodiment of a computing device utilizing the present invention.

FIG. 2 shows a computing device 202 which implements the present invention. The computing device comprises a logic module 216 which is logically connected to a motion detection module 214 and a motion sensitive device 212. The motion sensitive device may be a HDD, a compact disk device, a DVD device, or any other device that may be adversely affected by movements of the computing device. The motion detection module may be an accelerometer which detects movements of the computing device 202. Movements of the computing device 202 are classified as acceleration events. The motion detection module is capable of classifying the acceleration events according to intensity, direction, and duration. The logic module 216 is also capable of detecting patterns of acceleration events.

Figure 3:
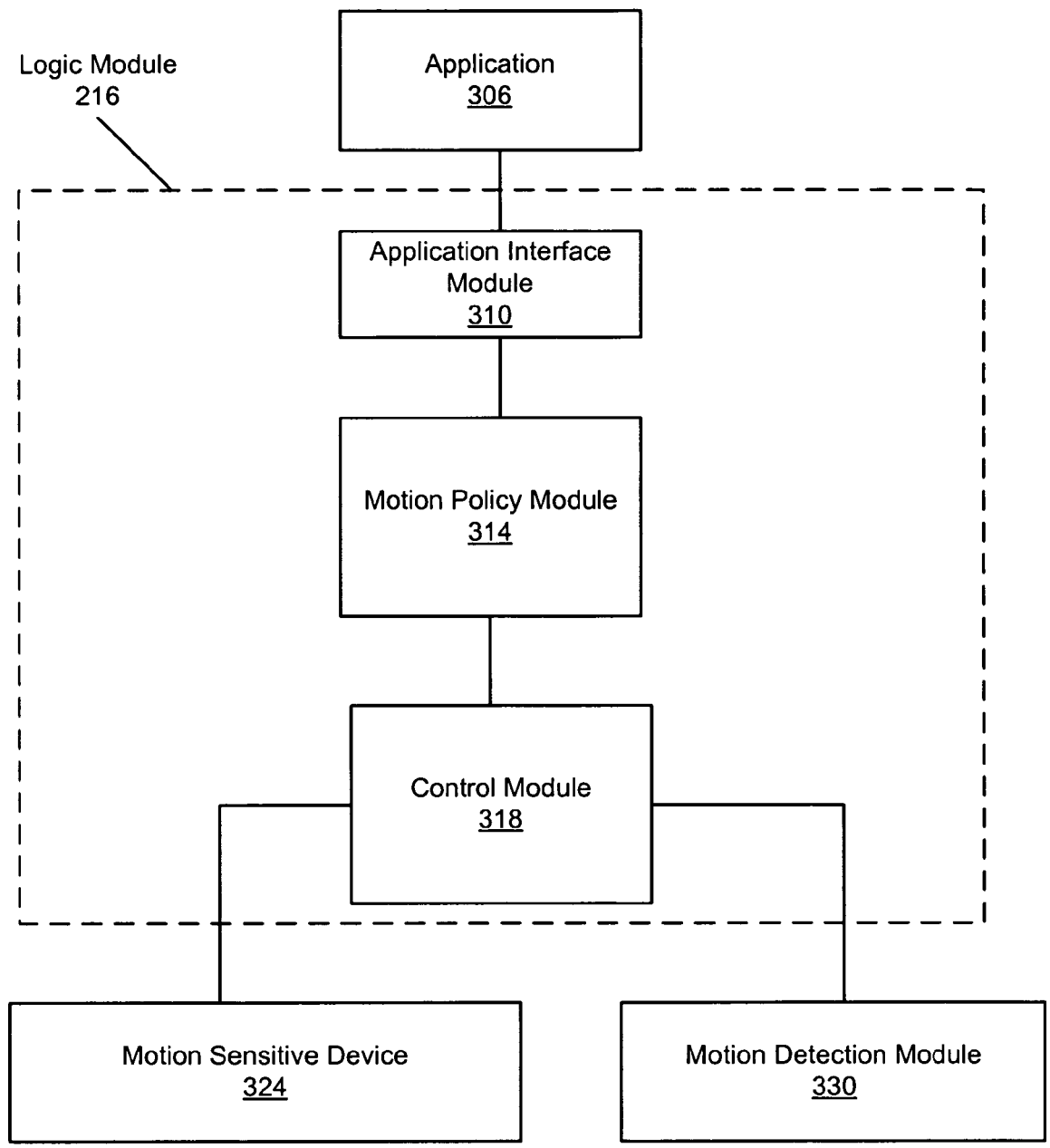
FIG. 3 is a schematic block diagram illustrating one embodiment of the present invention showing components of the invention illustrating a system of the current invention.

FIG. 3 illustrates an expanded view of the logic module 216 in communication with an application 306 running on the portable computing device. The logic module is also shown logically connected and in communication with a motion sensitive device 324 and a motion detection module 330.

The application 306 may be an application running on the portable computing device or it may be a sub-module of the operating system running on the portable computing device. In one embodiment of the invention, the application communicates with the logic module 216 information about the data requirements of the application 306 or of other applications on the system. For instance, the application may be a video player and may indicate that during the operation of video play, the read data rate for the video file needs to be kept constant. In another embodiment, the application in the operating system may indicate when applications are running which require consistent data read and write rates.

In FIG. 3, the logic module 216 comprises an optional application interface module 310, a motion policy module 314 and a control module 318. The application interface module 310 receives configuration information from application 306 and provides appropriate modifications to the motion policy module 314. The configuration information may include the existence of motion sensitive applications, the existence of motion policy aware applications, signals from motion policy aware applications, and policy configuration.

Motion sensitive applications are those applications which will not function appropriately if the application's read data rate or write data rate is compromised. For instance, a DVD player application requires a minimal read data rate in order to present a video production without pauses in the video playback. Also, an application to write a CD or a DVD requires a consistent data feed. An interruption in the write feed to a DVD drive while creating a DVD can make the target DVD unreadable. Such applications are termed motion sensitive applications.

Motion policy aware applications are applications which have the capability of communicating with the logic module the data requirements of the application. Motion policy aware applications may communicate with the logic module concerning data requirements that may be affected by the shutdown of a motion sensitive device. Policy configuration may include parameters used to balance the value of maintaining data rates to motion sensitive applications against the value of shutting down a motion sensitive device in an effort to protect the motion sensitive device from damage and in an effort to protect data on the motion sensitive device or in transit between applications and a motion sensitive device.

The motion policy module 314 manages the motion response policy that will be implemented in the logic module 216. The motion policy module may also manage information about the existence and requirements of motion sensitive and motion policy aware applications. The motion policy module 314 manages this information for the benefit of other modules comprised in the logic module 216. In particular, the control module uses the motion response policy as described below to determine appropriate actions to take in response to acceleration events reported by the motion detection module 330.

The motion policy module 314 manages the motion response policy. With respect to the motion policy module 314, the term "manages" may include setting or establishing an initial motion response policy. The initial motion response policy may be established according to a default policy. It may also be established according to an initial configuration message received by the motion policy module 314 or through the application interface module 310.

The term "manages" may also include containing, holding, maintaining or updating the motion response policy. The motion policy module 314 contains or holds the motion response policy in the sense that it is stored in the motion policy module or it may be retrieved from the motion policy module. The motion policy module maintains or updates the motion response policy in response to various events including initialization of the computing device, an operator command, a signal from a motion policy aware application, or in response to some other event.

The control module 318 makes the balancing decisions described above. The control module 318 uses the motion response policy from the motion policy module 314 to determine how to balance the data rate requirements of various applications against the goal of protecting the motion sensitive device from damage and the goal of preventing data loss.

The control module 318 receives input from the motion detection module 330. The motion detection module 330 notifies the control module 318 of acceleration events. These events may include intensity and vector information including directional information about acceleration events. In one embodiment, the control module 318 categorizes acceleration events according to intensity and likelihood of damage. The control module 318 also uses acceleration events to predict when more catastrophic events are likely to happen. For instance, when a portable computing device is dropped, the motion detection module 330 may record acceleration events which are indicative of free fall. The control module 318 may determine that the device is in free fall and act accordingly in anticipation of a much more damaging acceleration event. Often, it is not the fall that causes the greatest damage, but the sudden stop at the bottom.

Based on the motion response policy managed by the motion policy module 314 and the acceleration events, the control module may take one or more of a group of protective actions. The control module may shut down the motion sensitive device, notify motion policy aware applications of acceleration events, signal motion policy aware applications to modify data write and read rates, perform a user defined function, or do nothing.

To shut down the motion sensitive device 324, the control module 318 signals the motion sensitive device 324 to shut down. The motion sensitive device may completely shut down or may implement a temporary shutdown. As an example, a HDD may be parked or turned off. It should be understood that shutting down a motion sensitive device 324 is device dependent and may vary from device to device. Sometimes it may involve a removal of power. Other times it may involve a temporary shutdown or a signal to assume a protective status such as parking a HDD. All such actions are described for the purposes of this application as shutting down the motion sensitive device.

Figure 4:
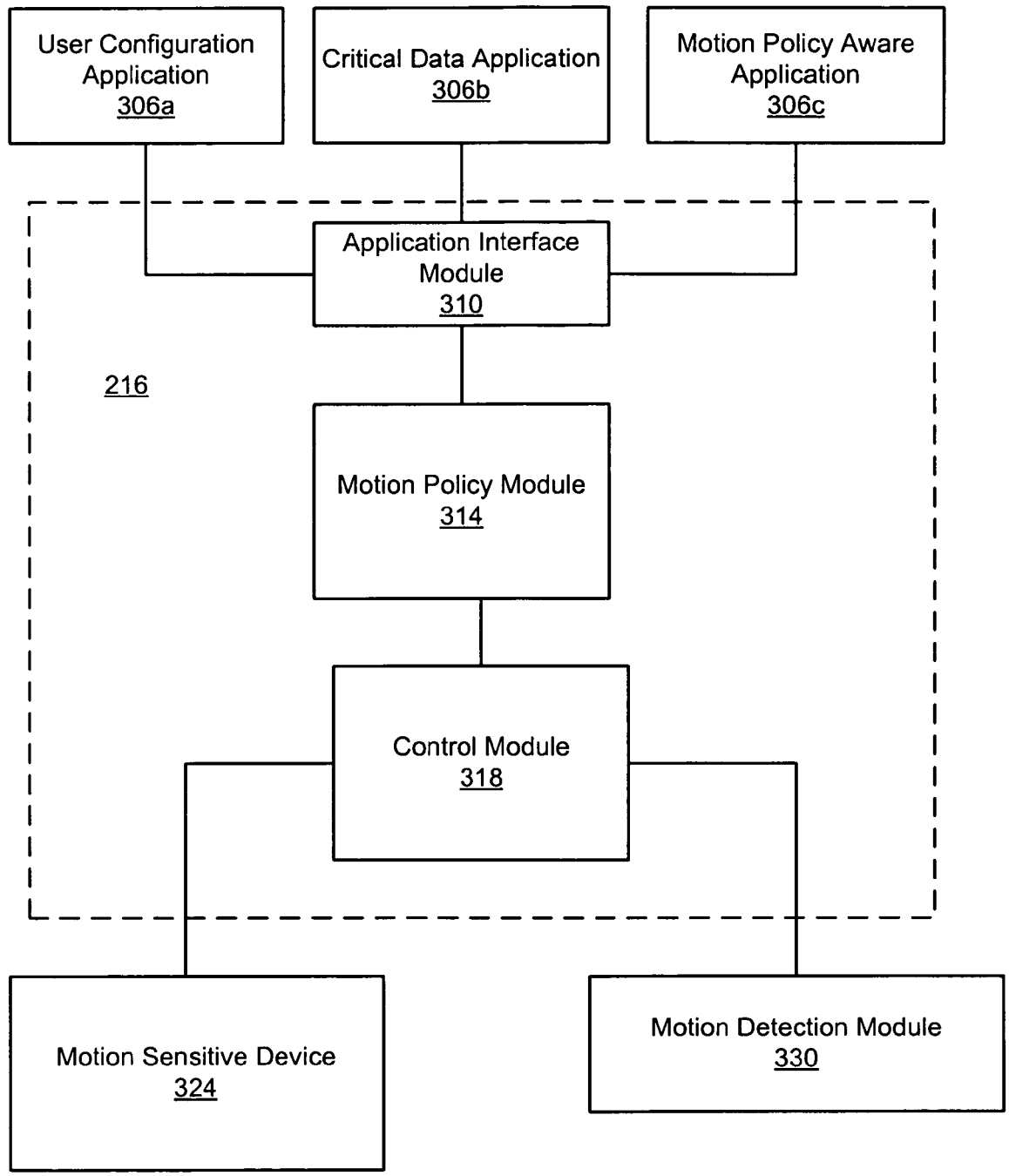
FIG. 4 is a schematic block diagram illustrating one embodiment of an alternative embodiment system of the present invention.

FIG. 4 shows the expanded logic module 216 of FIG. 3 in communication with multiple applications 306a, 306b, and 306c. In one embodiment, the application 306 is a user configuration application 306a. In another embodiment, the application 306 is a critical data application 306b. In another embodiment, application 306 is a motion policy aware application 306c. One system may comprise a plurality of one or more of these applications.

The user configuration application 306a may be an independent application running on the portable computing device or it may be a subcomponent of the operating system running on the portable computing device. The user configuration application gathers input from a user or from the operating system or from motion policy aware applications and delivers that information to the application interface module 310 of the logic module 216.

As an example, the user configuration application may allow a user to set a constant data rate policy which causes the protection policy to always value a constant data rate to and from all applications over the goal of protecting the motion sensitive device. As another example, the user may set a configuration which causes the control module to only shut down the motion sensitive device after recognizing a free fall event. Another configuration may cause the control module to issue a shutdown based on events indicative of slight bumps and jars to the portable computing device. The user configuration application 306a may present the different policies as environment settings such as "on an airplane," "critical video presentation," or "shutdown for all acceleration events."

The critical data application 306b is a motion sensitive application as described earlier. A video playback presentation application is an example of a motion sensitive application. A video playback presentation application may require the data rate from a HDD or a compact disk drive to be consistent. A salesperson providing a sales presentation does not want the video playback to pause for a few seconds during the presentation. In legacy systems, an accelerometer might shutdown a HDD based on the bumping of a table during such a presentation. The instant invention recognizes that some applications are more important than others and may justify overriding an acceleration event that otherwise would cause a HDD shutdown. The application interface module 310 may determine that a critical data application 306*b* is running on the portable computing device and transmit this information to the motion policy module 314 and in turn to the control module 318 for use in determining appropriate responses to acceleration events.

The motion policy aware application 306*c* is similar to a motion policy aware application described earlier. Such an application can send and receive signals to the application interface module 310 to notify the application interface module of the existence of a motion sensitive application and critical operations of the motion sensitive application. The motion policy aware application may also be capable of receiving signals from the control module 318 to modify data read and/or write rates during critical periods of time. For example, the control module 318 may temporarily shut down a motion sensitive device 324.

In conjunction with the shutdown, it may send messages to motion policy aware applications to buffer write data for a period of time in order to favor read data operations. It may also send messages to indicate that larger buffers should be used for read data in anticipation of impending shutdown actions. In this way, a motion policy aware application 306*c* may react to anticipated and actual shutdown events to limit data bottlenecks and favor critical data applications.

Figure 5:
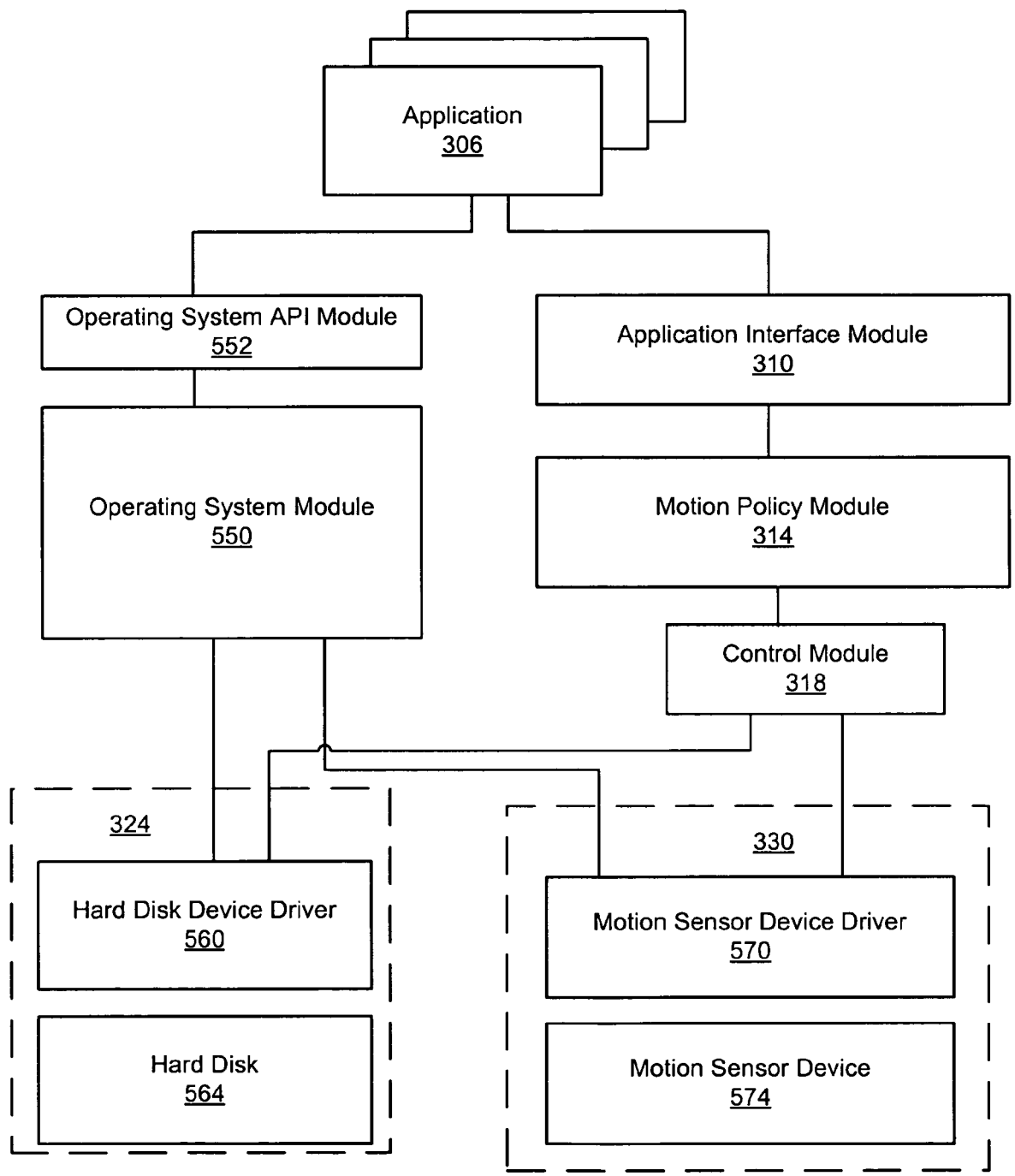
FIG. 5 is a schematic block diagram showing one embodiment of an alternative system of the present invention.

FIG. 5 shows a system of the present invention in which the logic module 216 comprising the application interface module 310, the motion policy module 314, and the control module 318, are modules running on a portable computing device in conjunction with an operating system module 550 and an operating system API module 552. Applications 306 running in the system communicate with the operating system API module 552 and with the application interface module 310 of the invention. FIG. 5 also shows that the motion sensitive device 324 may be a HDD 564 controlled by a hard disk device driver 560. The motion detection module 330 may comprise a motion sensor device 574 such as an accelerometer controlled by a motion sensor device driver 570.

FIG. 5 illustrates that the operating system 550 communicates with the device drivers from the hard disk drive 564 and the motion sensor device 574. Similarly, the control module 318 of the invention communicates with the hard disk device driver 560 and the motion sensor device driver 570 via the control module 318.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
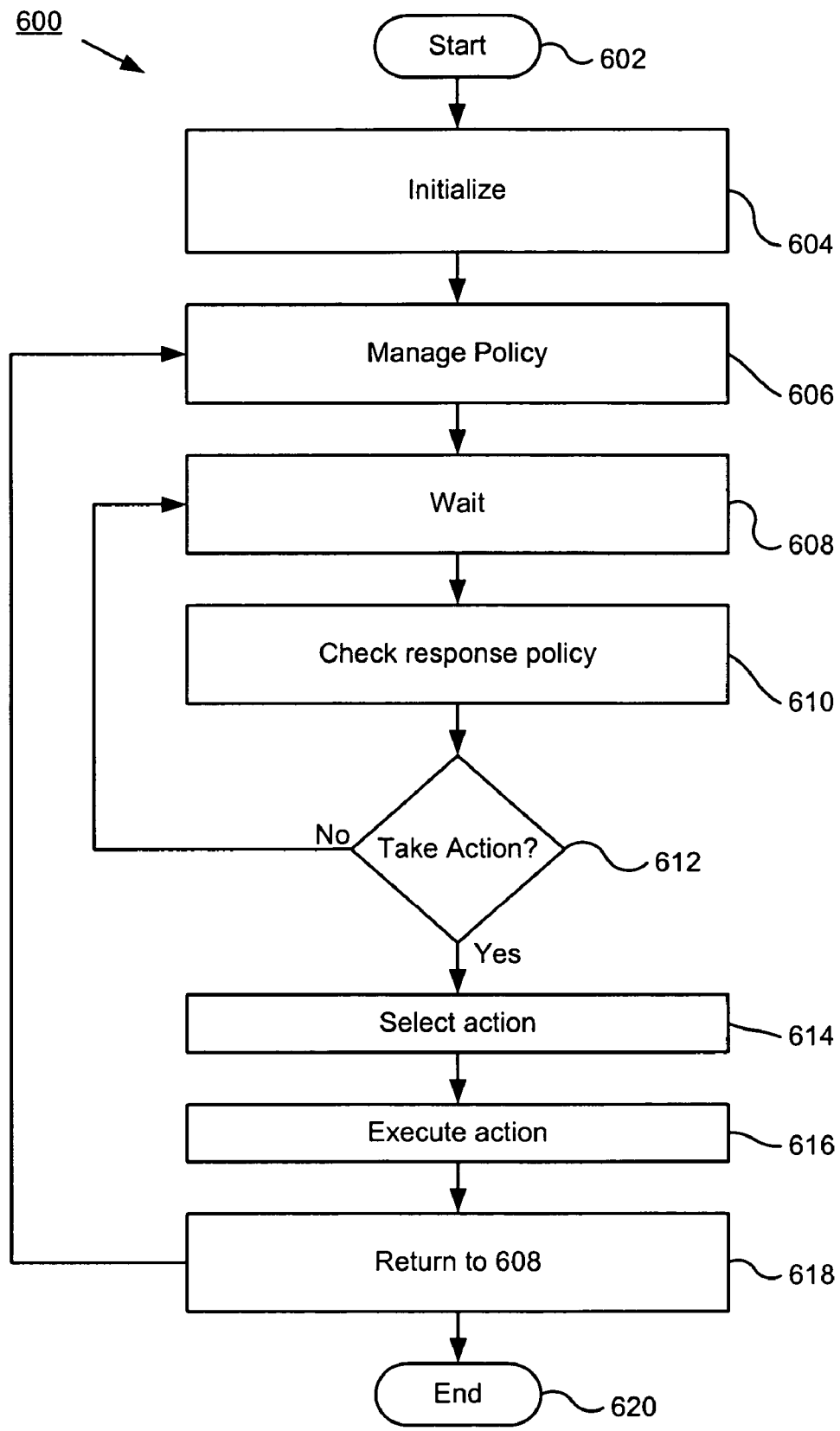
FIG. 6 is a schematic flow chart diagram illustrating one embodiment of a method for protecting a motion sensitive device in accordance with the present invention.

FIG. 6 illustrates a method and process of the present invention for selectively protecting a motion sensitive device in a portable computing device. The method comprises a start step 602, an initialize step 604, a manage policy step 606, a wait step 608, a check response policy step 610, a decision step to determine if it is appropriate to take action 612, a select action step 614, an execute action step 616, a return to the set policy step 618 and an end step 620.

It should be understood that the ordering of the steps may vary and that they are laid out in a specific order in FIG. 6 to illustrate one embodiment of the invention. However, the steps could be carried out in a distinct order and some steps could be carried out simultaneously.

The initialize step 604 includes the initialization of an application interface, a motion policy module, and a control module. This step brings the system to a point that it is ready to receive input from the operating system, currently running applications, and from a motion sensor device.

In the manage policy step 606, the system may set an initial motion response policy or the system may update the motion response policy. The system may configure a policy table which will be used in determining actions to be taken based on various events and the state of the system. For instance, a user may select a policy that favors data transport over protection of included motion sensitive devices. This step receives such policy settings and configures the system to relay the motion response policy to the control module when the system is deciding whether or not to take action in step 612 and when the system is choosing which action to take in step 614. The motion response policy information may also be received from currently running, motion policy aware applications and from the operating system as well, indicating the existence of motion sensitive applications or other parameters that the operating system may transmit.

In the wait step 608, the system waits for inputs which will affect whether or not the system determines that action should be taken. Inputs include input from a motion sensor device, input from motion policy aware applications, and input from the operating system.

The system enters the check response policy step 610 upon notification of system input described in step 608. In step 610, the system compares the received input against the current response policy and the state of the system. The system may categorize the input into different categories. Motion input may be categorized as bumps, jars, drops, crashes, bounces, etc. The motions may also be categorized according to groupings of motions which may correlate to predictable future acceleration events. For instance, a free fall event may predict a crash. A series of light bounces may be categorized as an airplane flight while a single bounce may be categorized differently. Additional inputs such as changes in motion policy aware application needs are also compared to the current response policy in step 610.

In the decision step 612, the system decides, based on the current policy, whether any action should be taken. If the current policy, system state, and inputs indicate that no action should be taken, the system returns to the wait step 608 and then waits for further input. However, if the current policy, system state, and inputs indicate that action should be taken, then the system moves to the select action step 614.

In the select action step 614, the system chooses an appropriate action based on the current policy, system state and input. The appropriate action may be any of the following actions, or another action determined by the user or the system: permanently shutdown the motion sensitive device; temporarily suspend the motion sensitive device in a protected state; signal motion policy aware applications to modify read rates; signal motion policy aware applications to modify write rates; signal motion policy aware applications to modify buffer usage and buffer sizes; and signal the operating system to take some action such as backing up a device or shutting down the entire portable computing device.

The temporary suspension of a motion sensitive device may correspond to the parking of a HDD. The permanent shutdown of the device may correspond to powering off the device. The precise action will vary from device to device and may be configured to be appropriate for a given device on a particular system. Signaling motion policy aware applications may cause them to reduce write speeds in favor of read activities. Such signaling may also indicate an end of restricted reads and writes. Once an action has been chosen, the system takes the step to execute the action 616.

Finally, the system in step 618 returns to the set policy step 606. If no new policy is available, then the system will wait in step 608 for additional inputs.

Figure 7:
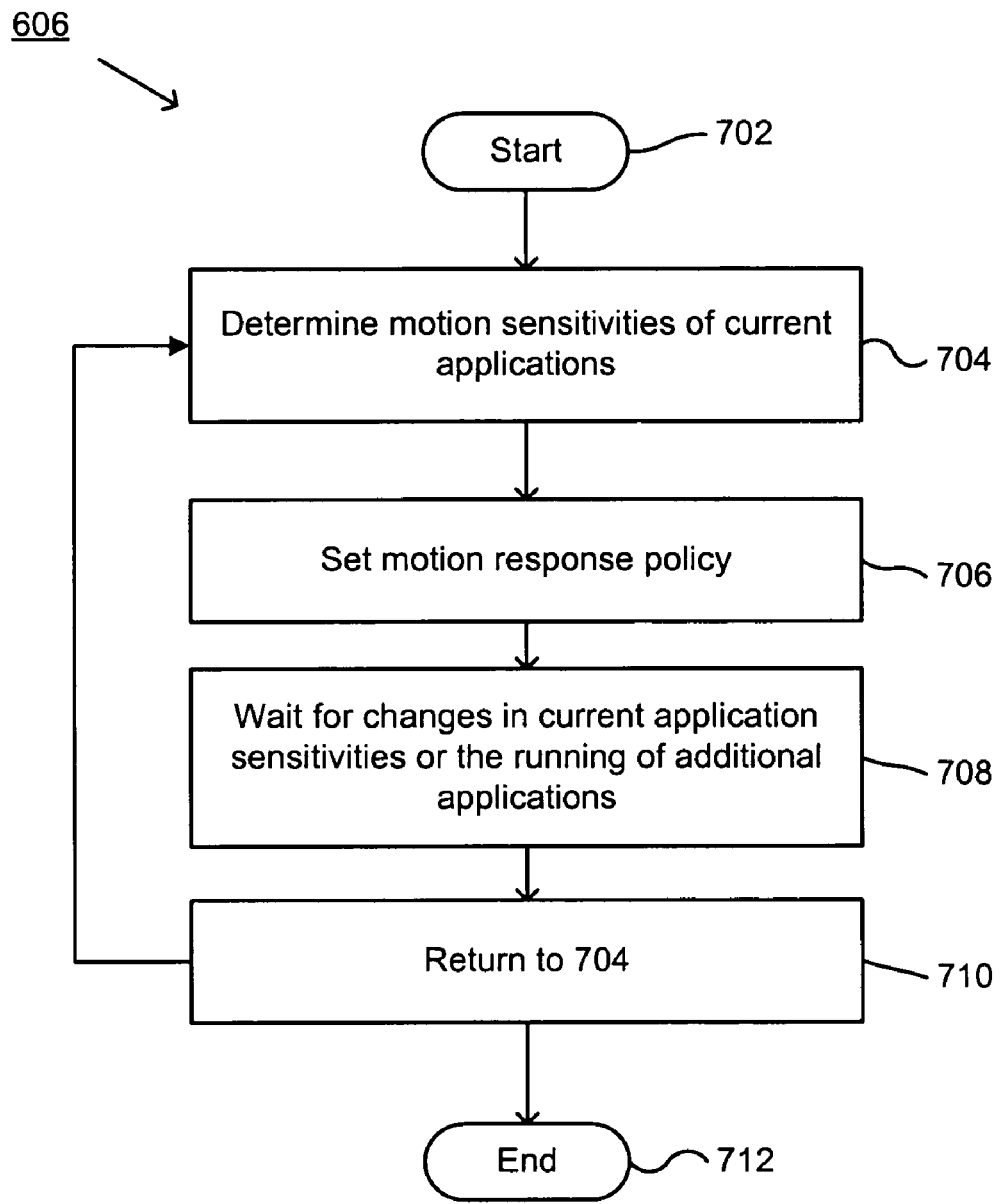
FIG. 7 is a schematic flow chart diagram illustrating one embodiment of one step of the method of FIG. 6.

FIG. 7 illustrates one embodiment of a manner of implementing the manage motion response policy step 606 from FIG. 6. The manage motion response policy step 606 of FIG. 7 comprises a start step 702, a step to determine the motion sensitivities of current applications 704, a step to set motion response policy 706, a step to wait for changes in current application sensitivities or the running of additional applications 708, a return step 710, and an end step 712.

As shown, the logical process of step 606 involves waiting for changes. This wait step may be implemented as a separate thread, not shown in FIG. 6, or it may be implemented as an interrupt, or in some other way known to those familiar to the art of software design.

Step 704, determining motion sensitivities of current applications, includes both the reception of signals from motion policy aware applications as well as the active determination by the system that motion sensitive applications exist.

The step of setting the motion response policy 706 creates a table, database, or other appropriate structure, which the system can use to lookup current motion response policy. As discussed earlier, input for this table, database, or structure may be received from motion policy aware applications, from the operating system, from the user, or from the active efforts of the system to determine the presence of motion sensitive applications.

In step 708, the system waits for changes which might affect the current response policy from the same sources mentioned earlier: motion policy aware applications, from the operating system, from the user, or from the active efforts of the system to determine the presence of motion sensitive applications.

In step 710, the system returns to step 704, the step of determining the motion sensitivities of current applications. The system enters the end step 712 upon shutdown of the system or the individual components connected with the system for protecting a motion sensitive device.

Figure 8:
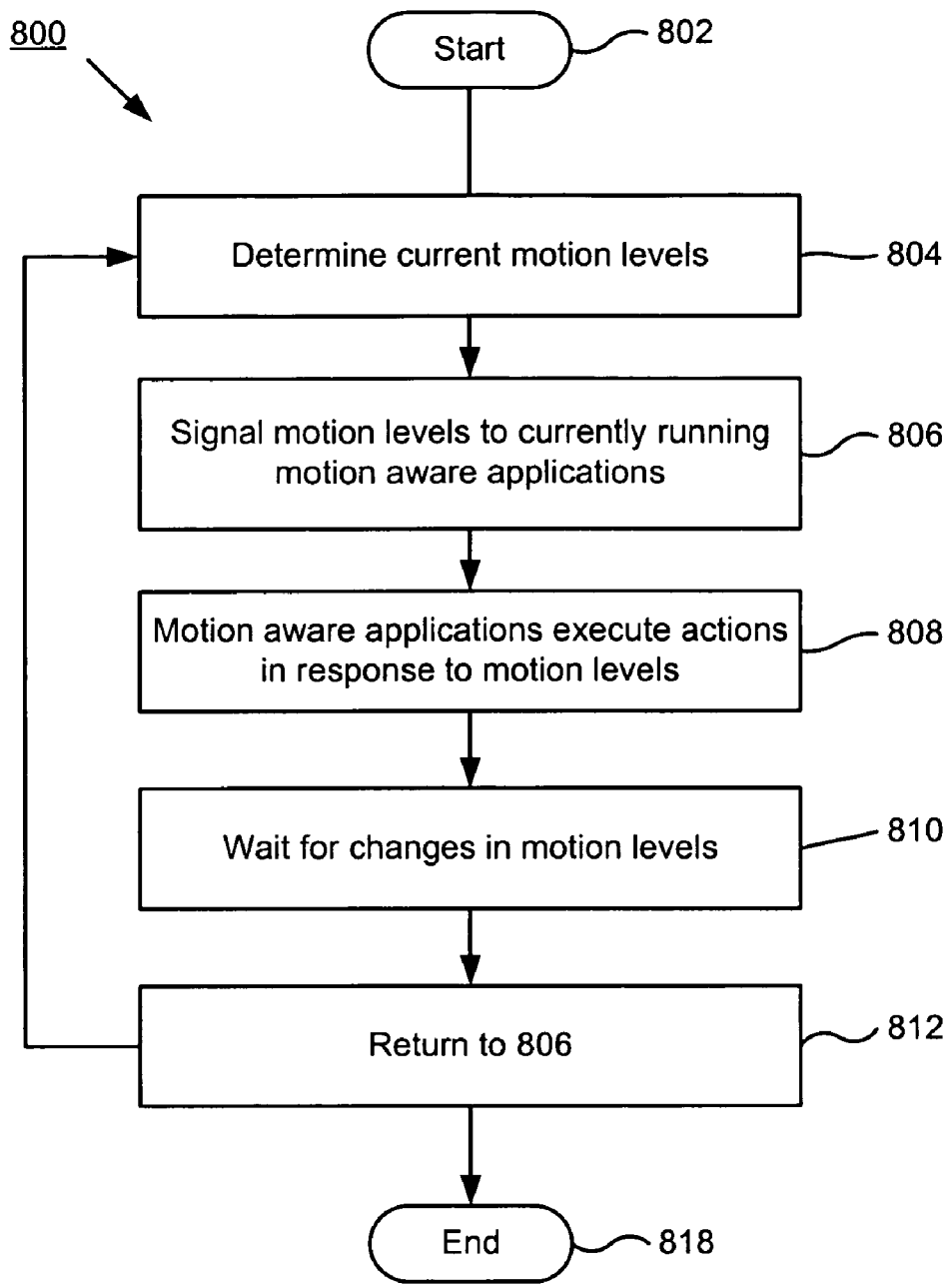
FIG. 8 is a schematic flow chart diagram illustrating an alternative embodiment of one method for protecting a motion sensitive device in accordance with the present invention.

FIG. 8 illustrates one of the possible actions that may be selected by the system as illustrated in step 616 of FIG. 6. The action 800 is an action to signal a modification of motion levels to motion policy aware applications. This action 800 comprises the following steps: start 802, determine current motion levels 804, signal motion levels to currently running motion policy aware applications 806, motion policy aware applications modify data write rates in response to motion levels 808, wait for changes in motion levels 810, return step 812 and end 818.

Step 804 is executed by the system, and the system determines the current motion level environment. The motion level may be determined according to a single acceleration event or in accordance with a classification of a series of acceleration events.

In step 806, the system sends information about the current motion levels to motion policy aware applications running on the system. A motion policy aware operating system may receive this signal as a proxy for applications running on the system that are not motion policy aware.

In step 808, the motion policy aware applications take actions in response to the current motion level signals just received. The motion policy aware applications may modify their write rates, modify their read rates, suspend themselves, modify their buffering parameters or take other actions appropriate to protect data and to follow current motion response policy.

In step 810 the system waits for further changes in the system motion levels. This wait process may be executed as a thread, an interrupt or other appropriate control means and illustrates that the actual ordering of this step and other steps discussed in the various figures may be executed in the orders shown, simultaneously, or in distinct orderings. Departure from this step is triggered by the reception of additional acceleration events.

In step 812, the system returns to the step 804 of determining current motion levels. The system enters the end step 818 when the system is shutdown or when the method for selectively protecting a motion sensitive device is terminated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to protect a motion sensitive device in a computer system, the apparatus comprising:
   an application interface running on the computer system and configured to receive motion policy configuration information from a user of the computer system and communicate the motion policy configuration information to a motion policy module;
   the motion policy module configured to manage a motion response policy;
   a motion detection module configured to detect acceleration events; and
   a control module configured to selectively execute an action comprising signaling a motion-aware application to modify a data output rate in response to a detected acceleration event in accordance with the motion response policy.

2. The apparatus of claim 1 wherein the executed action comprises shutting down the motion sensitive device.

3. The apparatus of claim 1 wherein the executed action comprises notifying the motion-aware application of the acceleration event.

4. The apparatus of claim 1 wherein the executed action comprises signaling an application to modify the amount of storage allocated to input/output buffers.

5. The apparatus of claim 1, further comprising,
   a motion intensity analysis module in communication with the motion detection module, the motion intensity analysis module configured to provide motion analysis information to the control module for use in selecting the action to be executed.

6. The apparatus of claim 1 wherein the motion sensitive device is a hard disk drive and the executed action comprises parking the heads of the disk drive.

7. The system of claim 6, the memory further comprising, a motion intensity analysis module in communication with the motion detection module, the motion intensity analysis module configured to deliver motion analysis information to the control module for use in selecting the action to be executed.

8. A system for protecting a motion sensitive device, the system comprising:
a Hard Disk Drive (HDD);
a processor;
an accelerometer coupled to the processor and the HDD, the accelerometer configured to measure acceleration events of the HDD; and
a memory comprising,
an application interface configured to receive motion policy configuration information from a user and communicate the motion policy configuration information to a motion policy module;
the motion policy module configured to manage a motion response policy;
a motion detection module configured to receive acceleration event notifications from the accelerometer; and
a control module configured to selectively execute an action comprising signaling a motion-aware application to modify a data output rate in response to an acceleration event in accordance with the motion response policy.

9. A program of executable code stored on a storage device and executed by a processor to perform a set of operations to protect a motion sensitive device, the operations comprising:
receiving motion policy configuration information from a user through an application interface;
managing a motion response policy;
receiving an acceleration event from an accelerometer;
comparing the acceleration event to the motion response policy; and
selectively executing an action comprising signaling a motion-aware application to modify a data output rate in response to the acceleration event in accordance with the motion response policy.

10. The program of claim 9, wherein setting motion response policy uses policy information from an application running on the digital processing apparatus.

11. The program of claim 9, wherein selectively executing an action comprises shutting down the motion sensitive device.

12. The program of claim 9, wherein selectively executing an action comprises sending a signal to applications currently running on the digital processing apparatus to notify said applications of current motion levels.

13. A method for protecting a motion sensitive device in a computing device, the method comprising:
receiving motion policy configuration information from a user through an application interface;
managing a motion response policy;
detecting an acceleration event; and
selectively executing an action comprising signaling a motion-aware application to modify a data output rate in response to the acceleration event in accordance with the motion response policy.

14. The method of claim 13, wherein the motion response policy includes a matrix of actions dependent on motion intensity, motion type and the type of applications currently running on the computing device.

15. The method of claim 13, the method further comprising classifying the acceleration event according to intensity.

* * * * *